No. 12,209. REISSUED MAR. 22, 1904.

F. L. HAWKINS.

LUBRICATING DEVICE.

APPLICATION FILED NOV. 6, 1903.

WITNESSES.
C. Goostray
C. S. Miller

INVENTOR.
Fred Lincoln Hawkins
By Henry J. Miller
atty.

No. 12,209. Reissued March 22, 1904.

UNITED STATES PATENT OFFICE.

FRED LINCOLN HAWKINS, OF GARDNER, MASSACHUSETTS.

LUBRICATING DEVICE.

SPECIFICATION forming part of Reissued Letters Patent No. 12,209, dated March 22, 1904.

Original No. 718,456, dated January 13, 1903. Application for reissue filed November 6, 1903. Serial No. 180,136.

*To all whom it may concern:*

Be it known that I, FRED LINCOLN HAWKINS, a citizen of the United States, residing at Gardner, in the county of Worcester and State of Massachusetts, have invented certain new and useful Improvements in Lubricating Devices; and I do hereby declare the following to be a full, clear, and exact description of the invention, such as will enable others skilled in the art to which it appertains to make and use the same.

The invention relates to devices for lubricating guard-rails of railroad-tracks.

The object of the invention is to support a body of oil or other lubricant in a convenient position below a car or engine and to provide means simple and durable in construction whereby portions of said body of lubricant may be delivered to portions of the rail or rails over which the car travels.

Another object of the invention is to provide means for replenishing the lubricant so supported from time to time and to subject the lubricant to pressure.

The object of the invention is also to prevent the thickening of the lubricant by reduced temperature.

Other objects of the invention will appear from the specification and claims.

The invention consists of a tank adapted to be supported below a car or engine and adapted to contain a body of lubricant under pressure, a discharge-pipe for said tank, and a pressure system connected with the tank.

The invention also consists in a tank of the nature described and in means for heating the tank.

The invention also consists in such other novel features of construction and combination of parts as shall hereinafter be more fully described, and pointed out in the claims.

Figure 1:
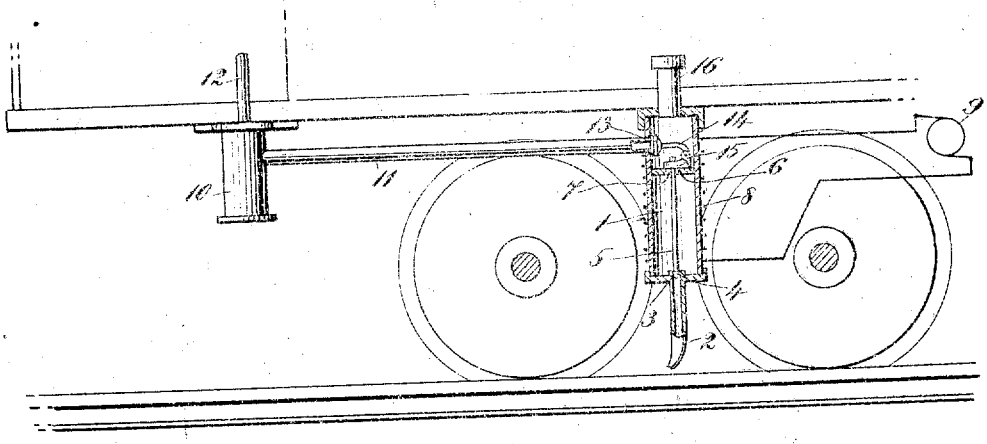
Figure 2:
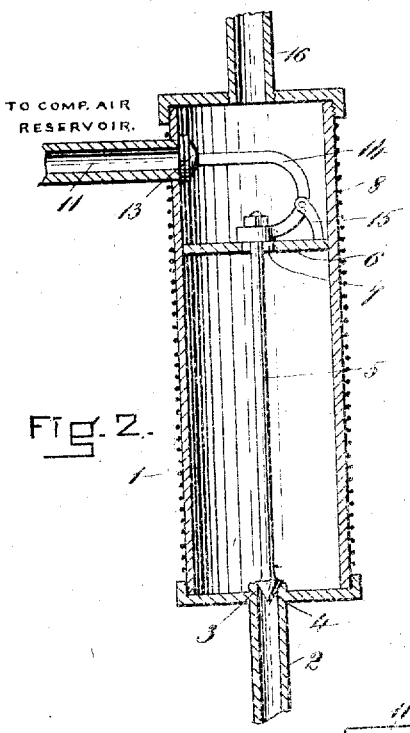
Figure 3:
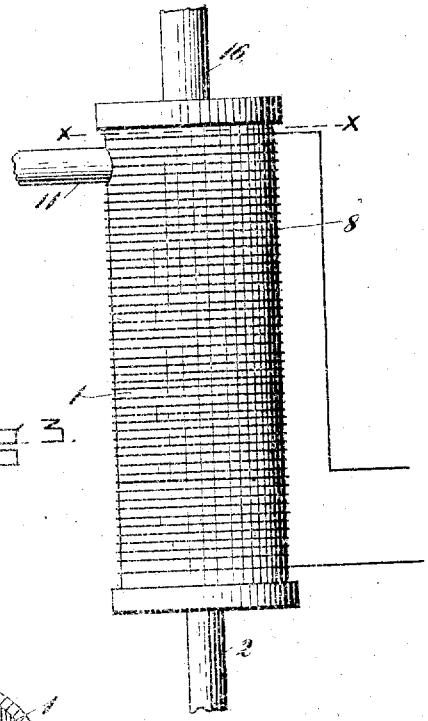
Figure 4:
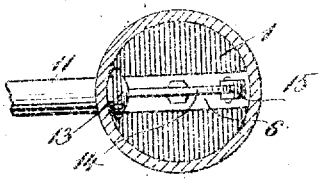

In the accompanying drawings, Figure 1 shows in conventional form the trucks of a motor or grip car, my invention being shown in longitudinal vertical section. Fig. 2 is an enlarged vertical sectional view of the lubricating device adapted for use upon a steam-car. Fig. 3 is a side view of the oil-tank, and Fig. 4 is a cross-sectional view looking downward on line $x$ $x$ of Fig. 3.

Referring to the drawings, 1 denotes an oil-tank, which may be mounted upon the car in any suitable manner and is provided in its lower end with a discharge-tube 2, leading downward toward the rail and adapted to discharge the lubricant upon the guard rail or flange.

3 denotes a valve-seat in the bottom of the tank, and 4 a needle-valve adapted to said seat and provided with a stem 5, which is guided in its vertical movement by a bar 6, having a slot 7, through which the stem passes.

8 denotes a heating-coil or an electrical heater surrounding the oil-tank and designed to prevent the thickening of the oil to such an extent as to prevent its free escape from the tank when the needle-valve is unseated.

9 denotes a source of electrical supply for generating the current for the heater.

16 denotes a tube for filling the oil-tank.

When the lubricating device is used upon cars not equipped with air-compressors—such, for instance, as grip and motor cars—I provide a pump 10, which is suitably mounted upon the car-frame and has a pipe 11 communicating with the upper end of the oil-tank. The rod 12 of the plunger extends within convenient reach of the motorman and may be operated by foot or by hand for the purpose of compressing air within the pump-cylinder and supplying the tank with such air.

13 denotes a valve located within the oil-tank for controlling the admission of air thereto and is formed with a curved stem 14, which is bolted or otherwise secured to the upper end of the stem of the needle-valve, with provision for slight pivotal motion at the joint. The curved stem 14 is pivoted to a stud 15, secured to the cross-bar 6, as more clearly shown in Fig. 2 of the drawings. It is evident that upon compression of the air within the cylinder of the pump 10 the valve 13 will be forced from its seat, and this movement of the valve will raise the needle-valve 4 from its seat. It will thus be seen that the air in the tank has two functions—namely, that of lifting the valve 4 from its seat and that of exerting a pneumatic pressure upon the column of liquid contained in the oil-tank for the purpose of forcing the same through the outlet in the bottom of the oil-tank.

In the construction shown in Fig. 2, wherein the device is adapted for use on a train of cars equipped with an air-brake system, the pump 10 is dispensed with and the compressed air is let into the pipe 11 by the engineer, thus controlling the valves at a point distant from the tank.

While oil is herein referred to as a "lubricant" to be used in this device, said term is only used in its general sense as designating lubricant of an oily nature, the device being particularly efficient in delivering to the rails lubricants of a heavy nature, such as graphite, whether in a powdered state or as a paste compound. A solution of oil and salt may also be used in this device. The advantage of using lubricants preferably other than thin oils is that such lubricants most readily adhere to the rails and are more economical and efficient.

It is obvious that various changes in form, proportion, and details of construction can be made without departing from the spirit of this invention and the prime object thereof, which is the supporting below the car of a comparatively large body of lubricant and providing means controllable at a distance therefrom by which said body of lubricant may be subjected to pressure from time to time, whereby a portion of said lubricant may be delivered to a rail or rails.

It is not my intention to herein claim a pipe into which lubricant and pressure are simultaneously supplied.

Having thus described my invention, I claim as new and desire to secure by Letters Patent—

1. The combination with a car, of a tank mounted below the car and adapted to contain lubricant under pressure, and a valved discharge-tube leading from said tank toward one of the rails on which the car is adapted to travel.

2. The combination with a car, of a tank mounted below the car and adapted to contain lubricant under pressure, a delivery-tube extending from said tank, a valve for said tube, and means for controlling the operation of the valve at a point on said car distant from the tank.

3. The combination with a car, of a tank mounted below the car and adapted to contain lubricant, a delivery-tube extending from said tank, a valve for said tube, means contained within the tank for operating the valve, and an air-pressure system for actuating said means.

4. The combination with a car, of a tank mounted below the car, a delivery-tube extending therefrom, a valve for the delivery-tube, means for supplying lubricant to the tank, a pressure system connected with said tank the pressure in which is adapted to be controlled at a point distant from the tank, and means, adapted to be acted upon by pressure in said system, for actuating the delivery-valve.

5. The combination with a car, of a tank mounted below the car and adapted to contain a comparatively large body of lubricant, a delivery-tube for said tank, means for raising the temperature of the lubricant in the tank, and a pressure system connected with the tank and adapted to supply pressure on the lubricant therein.

6. In a lubricating device, the combination with an oil-tank having a discharge-orifice and a valve for closing said orifice, of a compressed-air pipe communicating with said tank, a valve adapted to be operated by the admission of air into said tank, and a connection between the last-named valve and the first-named valve, whereby when the last-named valve is opened the first-named valve will be opened, substantially as set forth.

7. In a lubricating device, the combination with an oil-tank having a discharge-opening and a valve for closing said opening, said valve being provided with a stem, of a compressed-air pipe leading into said tank, a valve for closing said pipe, said valve being provided with a stem connected to the stem of the first-named valve and having a rocking movement, substantially as described.

In testimony whereof I affix my signature in the presence of two witnesses.

FRED LINCOLN HAWKINS.

Witnesses:
HENRY J. MILLER,
S. GOOSTRAY.